United States Patent [19]
Abler et al.

[11] Patent Number: 5,658,414
[45] Date of Patent: Aug. 19, 1997

[54] ORGANOMETALLIC SOLVENT SEAMING OF CELLULOSIC MATERIALS

[75] Inventors: Norman C. Abler; Zbigniew S. Borkiewicz; Donald E. Lucke, all of Madison, Wis.

[73] Assignee: Kraft Foods, Inc., Northfield, Ill.

[21] Appl. No.: 565,478

[22] Filed: Nov. 30, 1995

Related U.S. Application Data

[63] Continuation-in-part of Ser. No. 398,035, Mar. 3, 1995.

[51] Int. Cl.$^6$ .................................. C09J 5/00
[52] U.S. Cl. .................. 156/305; 156/326; 426/105; 426/135; 427/207.1; 427/288; 427/256; 427/259; 427/439
[58] Field of Search .................. 427/207.1, 288, 427/256, 259, 439; 426/105, 135; 156/305, 326

[56] References Cited

U.S. PATENT DOCUMENTS

| | | |
|---|---|---|
| 2,575,467 | 11/1951 | Riechel et al. . |
| 2,607,696 | 8/1952 | Kunz . |
| 2,685,770 | 8/1954 | Conti . |
| 2,773,773 | 12/1956 | Harder et al. . |
| 3,209,398 | 10/1965 | Ziolko . |
| 3,222,192 | 12/1965 | Arnold et al. . |
| 3,595,667 | 7/1971 | Turbak et al. . |
| 3,640,734 | 2/1972 | Oppenheimer et al. . |
| 3,652,354 | 3/1972 | Su ..................................... 156/73 |
| 3,657,769 | 4/1972 | Martinek . |
| 3,922,398 | 11/1975 | Bridgeford et al. ................. 427/259 |
| 4,230,041 | 10/1980 | Bailey et al. . |
| 4,240,852 | 12/1980 | Gomberg et al. . |
| 4,392,900 | 7/1983 | Helbing . |
| 4,397,337 | 8/1983 | Porrmann et al. . |
| 4,399,839 | 8/1983 | Hutschenreuter et al. . |
| 4,401,135 | 8/1983 | Andra et al. . |
| 4,401,136 | 8/1983 | Porrmann et al. . |
| 4,410,011 | 10/1983 | Andra et al. . |
| 4,439,282 | 3/1984 | Byrd . |
| 4,463,778 | 8/1984 | Judd et al. . |
| 4,517,254 | 5/1985 | Grapentin et al. . |
| 4,528,225 | 7/1985 | Hutschenreuter et al. . |
| 4,660,255 | 4/1987 | Townsend et al. . |
| 4,686,140 | 8/1987 | Lorenz .................................. 428/343 |
| 4,709,447 | 12/1987 | Townsend et al. . |
| 4,713,135 | 12/1987 | Bridgeford . |
| 4,727,625 | 3/1988 | Townsend et al. . |
| 4,736,775 | 4/1988 | Oxley . |
| 4,806,395 | 2/1989 | Walsh . |
| 4,842,022 | 6/1989 | Oxley et al. . |
| 4,879,123 | 11/1989 | Siebrecht . |
| 4,940,614 | 7/1990 | Kastl et al. . |
| 4,944,069 | 7/1990 | Townsend et al. . |
| 4,956,893 | 9/1990 | Townsend et al. . |
| 4,965,910 | 10/1990 | Townsend et al. . |
| 4,972,547 | 11/1990 | Townsend et al. . |
| 4,972,548 | 11/1990 | Townsend et al. . |
| 5,019,012 | 5/1991 | Townsend et al. . |
| 5,026,187 | 6/1991 | Belanger et al. . |

FOREIGN PATENT DOCUMENTS

| | | |
|---|---|---|
| 877561 | 9/1961 | United Kingdom . |

*Primary Examiner*—Kathleen Choi
*Attorney, Agent, or Firm*—Lockwood, Alex, Fitzgibbon & Cummings

[57] ABSTRACT

An improved method is described for the fusing, joining or seaming of cellulosic materials. The method utilizes a solution of selected organometallic compounds or metal oxides to rapidly crosslink opposing, overlapping cellulosic surfaces to provide secure seams. Enhanced seam strength is achieved by a subsequent moisture treatment. The tubular cellulosic casings are well-suited for the manufacture of sausages and sausage-like products. The seams according to this invention have exceptionally high shear strength and wet strength.

35 Claims, 7 Drawing Sheets

ORGANOMETALLIC SOLVENT SEAMING OF CELLULOSIC MATERIALS

CROSS-REFERENCE TO RELATED APPLICATION

This is a continuation-in-part of application Ser. No. 398,035, filed Mar. 3, 1995, still pending.

BACKGROUND OF THE INVENTION

This invention is directed to seamed cellulosic materials and a method for fusing, joining or seaming same to exhibit enhanced seam strength. While the invention has broad application for bonding, fusing, joining or seaming various types of items such as tubes, sheets, irregularly shaped pieces and other structural forms, the invention is particularly applicable to the manufacturing of artificial tubular sausage casings from cellulosic materials for use by the food industry in the preparation of sausages and sausage-like products.

The manufacture of artificial tubular casings from cellulosic materials has been practiced for many years, particularly for use in the processing of frankfurters and other sausage-shaped products; for example, salami and bologna. There are two general methods for preparing such artificial tubular cellulosic casings. In the first method the artificial casings are formed from a plastic-state cellulosic material which is extruded into tubular form. The extruded tubular casings, which are seamless, are then washed, dried and otherwise processed according to methods known to those skilled in the art prior to using such casings in the production of sausages. In the second method the artificial tubular casings are formed and seamed from a rollstock cellulosic film of definable width and thickness bypassing the rollstock film over forming collars and mandrels of various geometries familiar to those skilled in the art. The longitudinal edges of the rollstock film, which edges can be oriented longitudinally or helically, are overlapped for a distance and joined to form a seam. The casings manufactured by this second method can be made on-line, just prior to stuffing with the desired sausage product, or off-line. When manufactured off-line, the finished, seamed tubular casing is typically wound in layflat form before shirring, usually with accordion-like folds, into a hollow stick, or onto a rod or tube, for end use on the sausage manufacturing equipment. When the tubular casings are manufactured, especially when made off-line and shirred, it has been found that certain prior art proposals such as seams which are mechanically formed, formed dry or water-wetted, with or without thermal treatment, do not have sufficient strength to withstand the forces encountered during the shirring and/or sausage manufacturing steps.

The term "cellulosic material(s)" as used herein means a material which is based on cellulose and is to be understood to include all suitable forms of such cellulose based material including cellophane, regenerated cellulose, cellulose hydrate and cellulose derivatives such as, for example, cellulose ethers and cellulose esters. In addition, the term cellulosic material(s) includes proteins, collagens, alginates, starches and other naturally occurring polymeric materials which are suitable for and may be used in the manufacturing of tubular casings sausages and sausage-like products.

The term "rollstock film(s)" as used herein means a cellulosic rollstock film that is either uncoated or coated. A coated rollstock film is thus a composite material in which one or more functional coatings have been applied to either or both sides of a cellulosic film. Herein, the word "coated" and "composite" may be used interchangeably. The functional coating may be either continuous or discontinuous on either side of the rollstock film and is typically a composition which acts to modify the mechanical, biological or chemical characteristics of the cellulosic material. For example, the coating may increase the tear strength or decrease permeability of the cellulosic film or it may render the cellulosic material waterproof. A discontinuous coating may cover only that part of the film which will not be overlapped. In connection with the present invention, highly successful results are obtained with uncoated cellulosic materials. Coatings or composites as discussed can be used provided the bonding process and permeability are not seriously hindered.

A wide variety of substances have been used to bond the overlapping edges of the tubular casings formed, either on-line or off-line, from the cellulosic or composite cellulosic rollstock films described above. U.S. Pat. No. 2,607,696 to Kunz describes sealing or joining together a hydrophilic sheet material (e.g., a cellulosic material such as regenerated cellulose rollstock film) by the use of acidified solutions of water-soluble, partially polymerized, heat-hardening resins such as an urea-formaldehyde resin or a melamine-formaldehyde resin. U.S. Pat. No. 3,595,667 to Turbak et al. describes sealing or joining sheets or films of regenerated cellulose or fiber-reinforced regenerated cellulose using a mixture of a polymeric polyisocyanate and an activator such as a polyol. U.S. Pat. Nos. 4,399,839 and 4,528,225 to Hutschenreuter et al. describe sealing or joining the longitudinal edges of a cellulose material by the use of a substantially water-soluble cationic resin which is a condensation product selected from the group consisting of a polyamide-polyamine including an aliphatic polyamine or polyamide with bifunctional halohydrins or derivatives thereof. U.S. Pat. No. 4,713,135 to Bridgeford describes the use of an aqueous zinc chloride, together with heat and pressure, to seal or join the overlapping edges of a cellulosic material.

Additional disclosure of methods for sealing or joining the overlapping edges of cellulosic materials or synthetic polymer materials, alone or in combination with cellulosic materials, may be found in the following U.S. Patents:

U.S. Pat. No. 2,575,467, to Reichel et al., which describes helical windings of strip material in forming stuffing casings with an overlap to form a joint which may be sealed with a sealing liquid that can include a basic solvent for the strip material;

U.S. Pat. No. 2,685,770, to Conti, which describes seamed casing formed by folding about a stuffing horn a flexible sheet of alkali-sensitive material such as regenerated cellulose to define overlapped edges which are sealed by an adhesive which may be an alkaline solution;

U.S. Pat. No. 2,773,773, to Harder et al., which describes the application of a solvent to thermoplastic, thermosetting or cellulosic materials, or to filaments applied to such materials, to promote sealing or joining of overlapping edges of such materials; examples in the case of cellulosic materials being a regenerated cellulose solvent adhesive such as tribenzylmethylammonium hydroxide, an alkali soluble cellulose ether or sodium hydroxide;

U.S. Pat. No. 3,640,734, to Oppenheimer et al., which describes the use of polyvinyl alcohol/polyvinyl ester copolymer films for forming tubular casings and the use of adhesives such as plasticized polyvinyl alcohol or polyvinyl alcohol/polyvinyl ester copolymers, solutions of polyvinyl alcohol copolymers in volatile organic solvents, or reactive adhesives such as isocyanates and epoxies;

U.S. Pat. No. 4,230,041, to Bailey et al., which describes the use of synthetic rubber, epoxy resins, acrylic compounds, and unsaturated compounds having vinyl groups as adhesives for bonding thermoplastic materials to a fibrous material made from synthetic plastics materials (for example, polyolefins, polyamides, polyacrylates or polyesters), or plant materials such as jute or cotton, or cellulose derivatives such as rayon;

U.S. Pat. Nos. 4,397,337 and 4,401,136, to Porrmann et al., which describe the use of thermoplastic or thermosetting synthetic resins as adhesives for seaming regenerated cellulose materials; examples of such adhesives being ethylene/vinyl acetate copolymers, low molecular weight polyethylene, atactic polypropylene, styrene/isoprene copolymers, copolymers containing carboxyl groups, fusible polyesters, polyurethanes, polyamides and polyaminoamides;

U.S. Pat. No. 4,399,839, to Hutschenreuter et al., which describes the use of an adhesive selected from the group consisting of polyamide-polyamine, an aliphatic polyamine or a polyamide with bifunctional halohydrins;

U.S. Pat. Nos. 4,410,011 and 4,401,135, to Andra et al., which describe adhesive materials including water soluble proteins (gelatin, egg albumin and glutenin) and cationic, thermosetting resins such as those described by Porrmann et al. in the patents cited above;

U.S. Pat. No. 4,517,254, to Grapentin et al., which describes activating a polyimide film to break =N—C(O)— imide bonds, reacting the broken bonds with a polyamine to provide terminal amine groups and binding metal ions such as copper or nickel ions to such amine groups;

U.S. Pat. Nos. 4,709,447, 4,727,625, 4,944,069, 4,965,910, 4,972,547, 4,972,548 and 5,019,012, to Townsend et al., which describe helically formed, elongated casing having overlapping side edges sealed by frictional cohesiveness, which cohesiveness typically is enhanced by application of moisture (i.e., water) to the casing material;

U.S. Pat. Nos. 4,736,775 and 4,879,123, to Oxley, which describe the use of pressure sensitive adhesive tape(s) to seal the opposing lateral, overlapping edges of a casing material formed into tubular shape;

U.S. Pat. No. 4,806,395, to Walsh, which describes treating polyimide films with alkali and an amine to open the polyimide ring system and provide a means whereby metal ions can be coordinated to the polyimide for the purpose of initiating electroless plating; and U.S. Pat. No. 4,879,123, to Siebrecht, and U.S. Pat. No. 4,940,614, to Kastl et al., which describe the use of an adhesive tape to seal opposing, overlapping edges of a film material formed into a tubular shape.

Certain prior art discuss the so-called humidification of synthetic sausage casings by adding water and the like to cellulosic tubes that had been extruded or otherwise directly formed into a cellulosic tube. These include Ziolko U.S. Pat. No. 3,209,398, Arnold et al U.S. Pat. No. 3,222,192 and Martinek U.S. Pat. No. 3,657,769. In approaches of this type, the moisture is added to facilitate shirring and subsequent deployment of shirred casings by adding moisture just prior to the shirring head. In addition, the cellulosic tube is inflated during such moisture application prior to shirring.

Each of the various United States patents referred to herein is incorporated by reference hereinto.

While the art of longitudinally or helically seaming or joining cellulosic materials has thus been the subject of many patents and other publications, no seaming approach has been described which is satisfactory in all aspects for the manufacturing of tubular cellulosic casings from rollstock cellulosic film. Inevitably, each of the prior art methods of seaming or joining has resulted in one or more problems. For example, in some cases the cellulosic material at the seam is either weakened by application of the functional adhesive coating or the cellulosic material is distorted during the seaming process. In other cases, the bond between the cellulose and the adhesive is too weak for consistent and reliable performance. The seaming process sometimes requires duplication of processing steps which adds to the expense of manufacturing the final sausage or sausage-like product. Also, adhesive materials used in the joining or seaming process typically must be applied at a width and/or thickness which results in a final product that has a seam area band of different color or shade of intensity than the bulk of the final product. While the band may not affect cooking or taste, it detracts from visual appeal, a very important aspect of all food products. Since the prior art approaches of seaming or joining cellulosic films typically results in such defects, a real need exists for an inexpensive approach for seaming or joining cellulosic materials that provides final products which will ultimately not have this objectionable visual band.

It is an object of the present invention to provide an improved method or process for producing, either on-line or off-line, a seamed, tubular casing by forming rollstock cellulosic film into a tube and longitudinally fusing, that is, bonding, seaming or joining, the edges of the film using the novel fusing agents disclosed herein. The novel fusing agents used in the invention are generically termed "organometallic solvents".

It is another object of the invention to provide casings using the novel fusing agents which allow the agent-fused, -seamed, -bonded or -joined region of the cellulosic film to maintain its integrity throughout the entire forming, moisture conditioning, shirring (when formed off-line) and food processing steps used in the manufacturing of a finished sausage or sausage-like product.

It is an additional object of the present invention to provide a fusing agent which produces a seamed or joined region of sufficient strength to withstand the mechanical or other stresses placed upon the seam during the manufacture of a final sausage or sausage-like product.

It is a further object of the invention to provide a fusing agent which will rapidly provide a seamed or joined region of the tubular casing produced from rollstock film so that when the casing is made either on-line for immediate sausage-making use or off-line for future use after shirring and other processing, the fused, seamed or joined casing may be put to such uses within the minimum possible time.

Another object of the invention is to provide casing having enhanced seam bond strength by adding moisture rapidly after fusing agent application.

Other objects and advantages to using the invention will become evident to those skilled in the art upon reading the details of the description of the invention.

SUMMARY OF THE INVENTION

The invention provides a new and improved method for fusing, seaming, bonding and joining cellulosic materials and casings and the like formed thereby, the invention including the use of organometallic solvents applied to substantially that portion of the cellulosic material which is overlapped to provide for the fused, seamed, bonded or joined region; the organometallic solvents being defined herein. In particular, the invention provides a new and improved method for fusing, seaming, bonding or joining overlapping portions of rollstock cellulosic film or films into tubular casings, as well as casings and the like formed thereby, the invention including the use of organometallic solvents applied to substantially that portion of the cellulosic material which is overlapped in order to provide the fused, seamed, bonded or joined region, promptly followed by increasing moisture levels along at least this region, thereby enhancing the wet strength of the bond and thus of the casing.

The "organometallic solvents" used in accordance with the invention are aqueous hydroxide solutions of either selected transition metal organometallic compounds or selected metal oxides. The preferred organometallic solvents are aqueous hydroxide solutions of organometallic compounds of copper, nickel, iron, cobalt and zinc; and the metal oxides of zinc and beryllium.

DETAILED DESCRIPTION OF THE PREFERRED EMBODIMENTS

Figure 4:
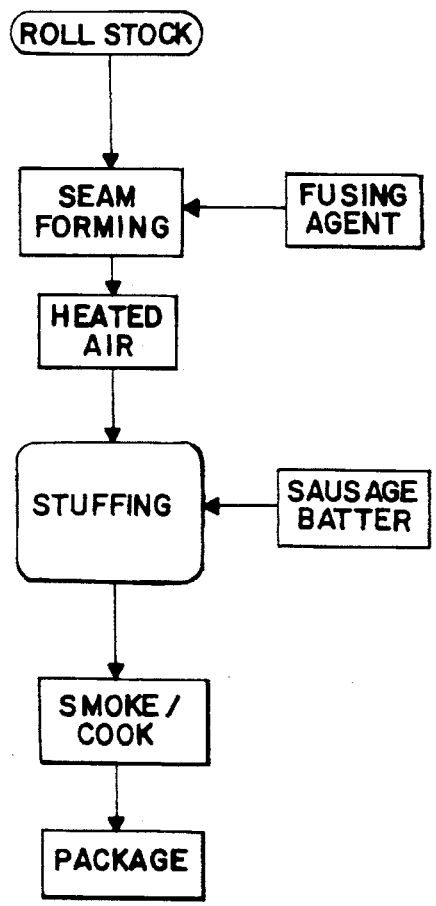
FIG. 4 is a flow diagram of a typical process for on-line sausage casing manufacturing according to the invention.
Figure 5:
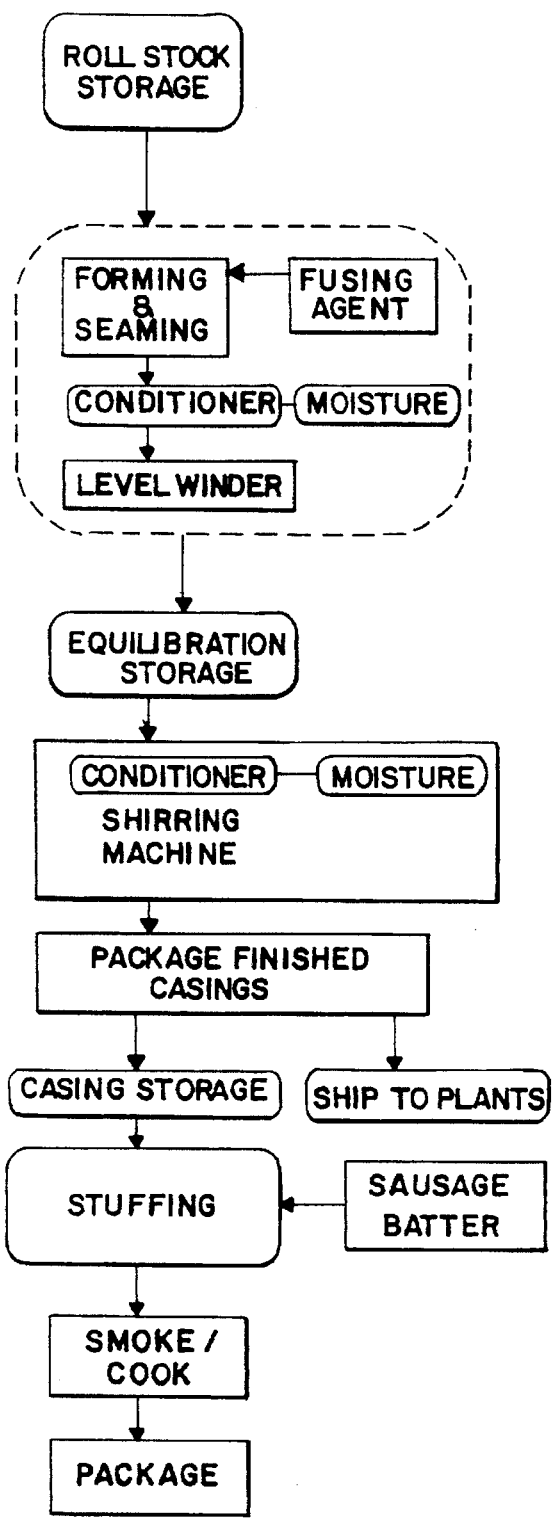
FIG. 5 is a flow diagram of a typical process for off-line sausage casing manufacturing according to the invention.
Figure 6:
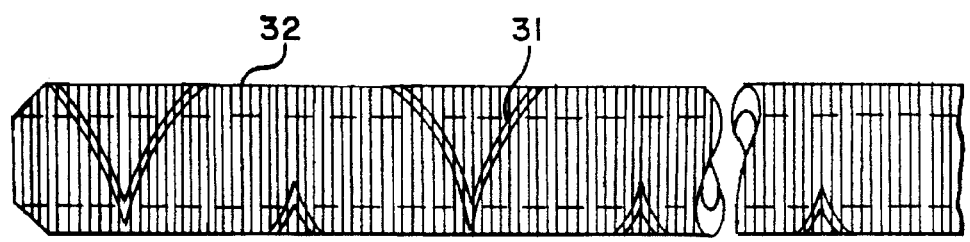
FIG. 6 is an illustration of a typical shirred casing made according to a process as illustrated in FIG. 5.
Figure 7:
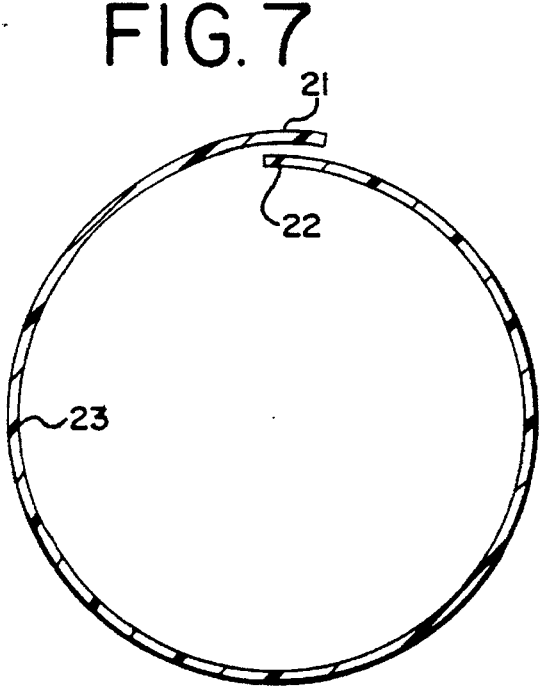
FIG. 7 is a cross-sectional view of an example of a seamed casing according to the invention.

In general, the invention comprises the use of an organometallic solvent to form a chemical bond between two layers of a cellulosic material by crosslinking the layers, followed by moisture addition to enhance bond strength. (The crosslinked layers may also be said to be fused, seamed, joined or bonded.) In particular, the invention includes the formation of tubular sausage casing and the formation thereof from cellulosic materials, regenerated cellulose rollstock film being preferred, using an organometallic solvent to crosslink overlapping edges of one or more lengths of the rollstock film. The organometallic solvents used according to the invention result in a crosslinking of the overlapping cellulosic layers and provide a superior seam bond without the need for an extended curing time and without having to develop an adhesive bond. For example, when the method of the invention is used on-line, the tubular casings prepared according to the invention can be used for sausage manufacture within a few seconds of the casing being manufactured. This is generally depicted in FIG. 4. When prepared off-line, the tubing will be further processed and shirred for future use. This is generally illustrated in FIGS. 5 and 6.

The organometallic solutions described herein, when applied to and sandwiched between two overlapping layers of Cellulosic material, work as a crosslinking, fusing, seaming, joining or bonding agent by chemical reaction with the cellulosic material. While the exact mechanism has not been determined, it is believed that upon application of the solvent to the first of the cellulosic surfaces which are to be fused, the hydroxide ion and the organic part of the organometallic compound spread the cellulose fibers and break hydrogen-oxygen bonds on the cellulose surface, without breaking cellulose oxygen-carbon bonds, so the metal (M) present in the organometallic compound can bond or coordinate to the cellulose oxygen atoms. Upon overlapping the first film edge with the second film edge, the same reaction occurs between the organometallic compound and the second film surface so that ultimately the metal is coordinated to oxygen atoms bound to both cellulosic surfaces. The metal thus serves to link the two cellulosic surfaces. No adhesive layer is formed between the surfaces. It has been empirically determined that the reaction is very rapid, developing good bond strength within a few seconds after the application of the organometallic solvent and the mating of the cellulose surfaces, typically not more than 5 seconds, preferably not greater than 3 seconds.

Figure 1:
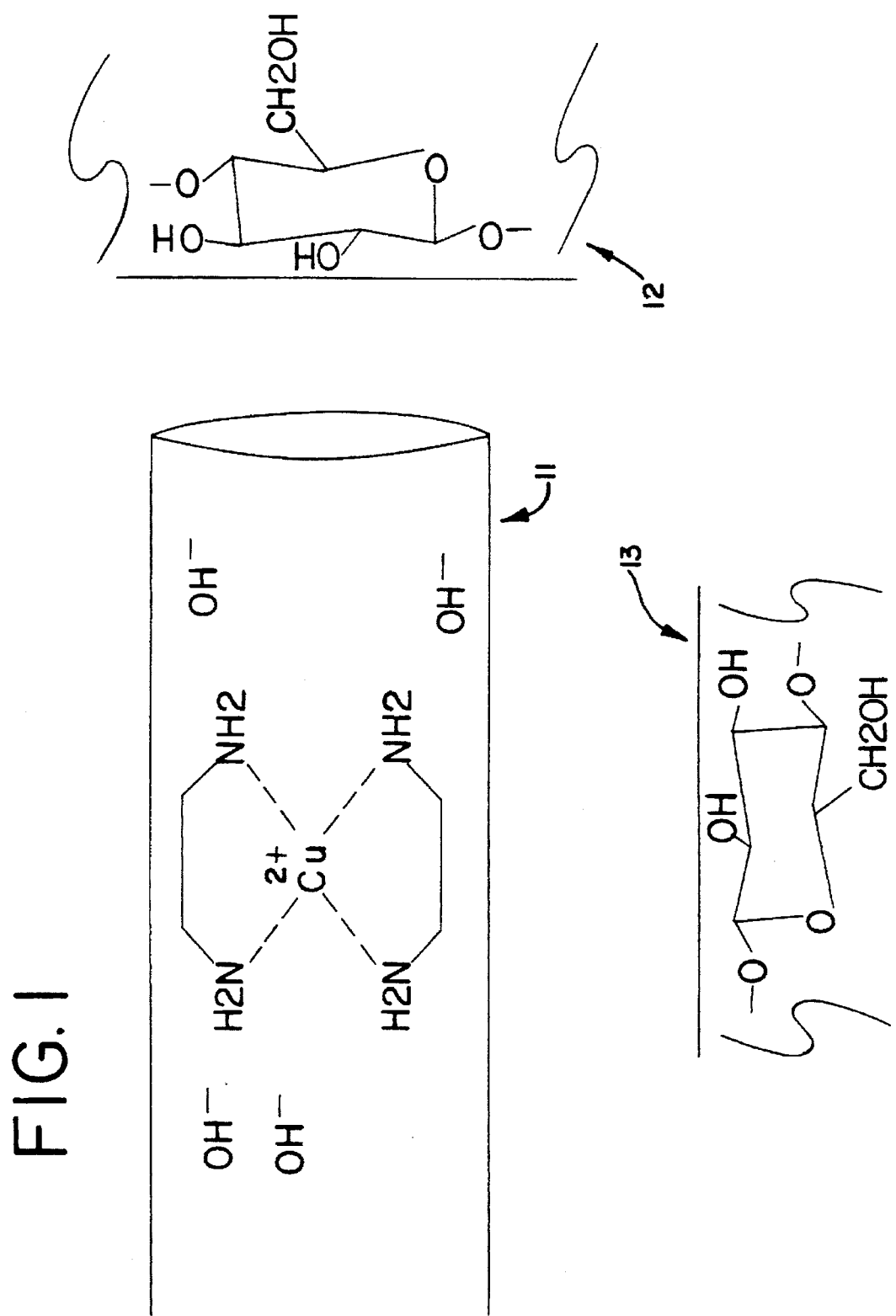
FIG. 1 illustrates the chemical composition of a preferred organometallic solvent and the cellulosic film surfaces to which it will be applied just prior to the application of such solvent and mating of the two surfaces which are to be fused, seamed, bonded or joined by action of such solvent.
Figure 2:
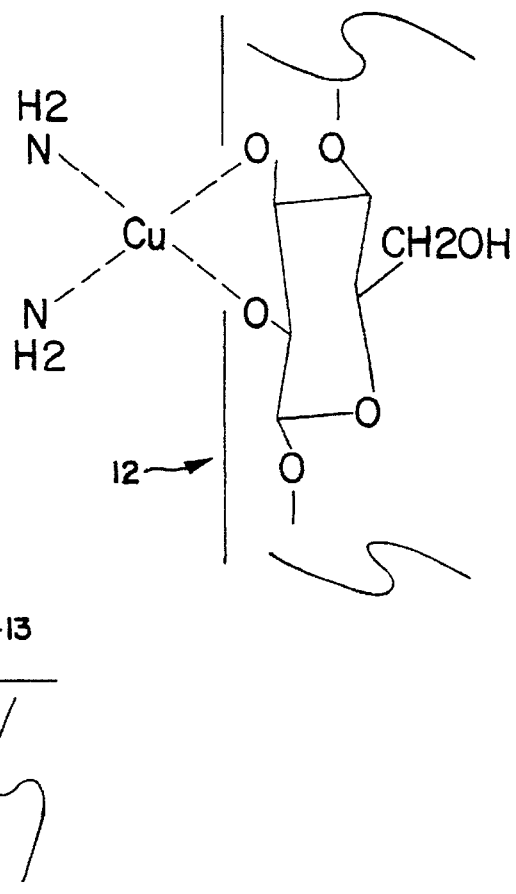
FIG. 2 illustrates what is believed to be an intermediate stage in the mechanism by which two cellulosic film surfaces are fused, seamed, bonded or joined according to the invention.
Figure 3:
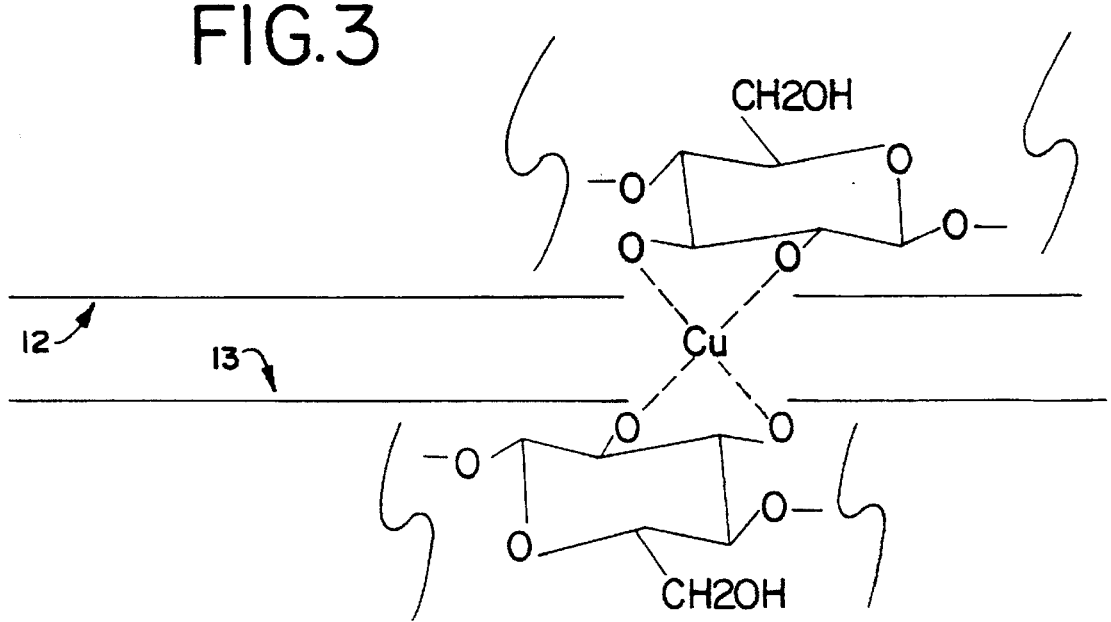
FIG. 3 illustrates what is believed to be the chemical structure of the fused, seamed, bonded or joined region formed by action of the organometallic solvent upon the cellulosic film surfaces.

FIGS. 1 through 3 can be used to illustrate the crosslinking reaction believed to be occurring. In FIG. 1, the organometallic solvent comprising an organometallic compound, illustrated by cupriethylenediamine, and hydroxide ion ($OH^-$) is contained within an applicator tip 11. The solvent is applied to a first cellulose film surface 12 which is to be fused to a second cellulose film surface 13. Upon application of the solvent to surface 12, the hydroxide ion deprotonates terminal hydroxyl groups (—OH) present on surface 12 to form an oxide ion ($O^-$) on the surface of the cellulose. The oxide ion, being a stronger base than amine nitrogen, will displace ethylenediamine and coordinate to the metal ion M (here Cu) as shown in FIG. 2. Generally, steric hinderance will prevent further elimination of organic compounds, ethylenediamine in these figures, coordinated to metal which is bound to the first cellulosic surface. The seaming of the cellulosic film as depicted in FIGS. 1–3 is performed at ambient temperature, defined herein as a temperature of in the range of about 5° to about 30° C. (or 40° to about 86° F.).

Figure 8:
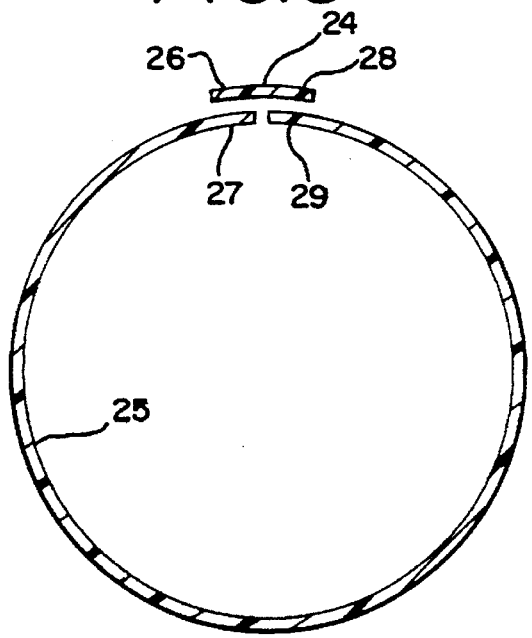
FIG. 8 is a cross-sectional view of another embodiment of a seamed casing according to the invention.

After the organometallic solvent is applied to the first cellulosic layer, the first cellulose layer is then placed in contact with the second cellulose layer and light pressure applied to insure contact between the two layers. The two layers can be opposite edges 21, 22 of a single sheet 23 that is being formed into the casing tube as illustrated in FIG. 7, FIG. 9, FIG. 13 and FIG. 14. Other assemblies are possible such as incorporating an elongated strip 24 to join the opposite edges of the sheet 25 being formed into the tubing as shown in FIG. 8. Here, there are two pairs 26, 27 and 28, 29 of the overlapping edges. In this instance, the opposite end portions 27, 29 of the sheet 25 need not overlap, but they can be thus joined by the elongated strip 24 which is joined to both of the opposite ends of the sheet in accordance with the teachings of the present invention.

Usually, assembly pressure is applied in association with a mandrel having a selected cross-sectional shape. The selected shape may be curved and/or may have a flat support surface at which seaming occurs. Generally a rectangular cross-section is preferred. In any event, the perimeter of the mandrel cross-section should be less than the inner diameter of the completed tube. Typically, pressure may be applied by passing the two layers between rollers or between a sleeve and the mandrel used in forming the tubing. Gas pressure also may be used.

Figure 9:
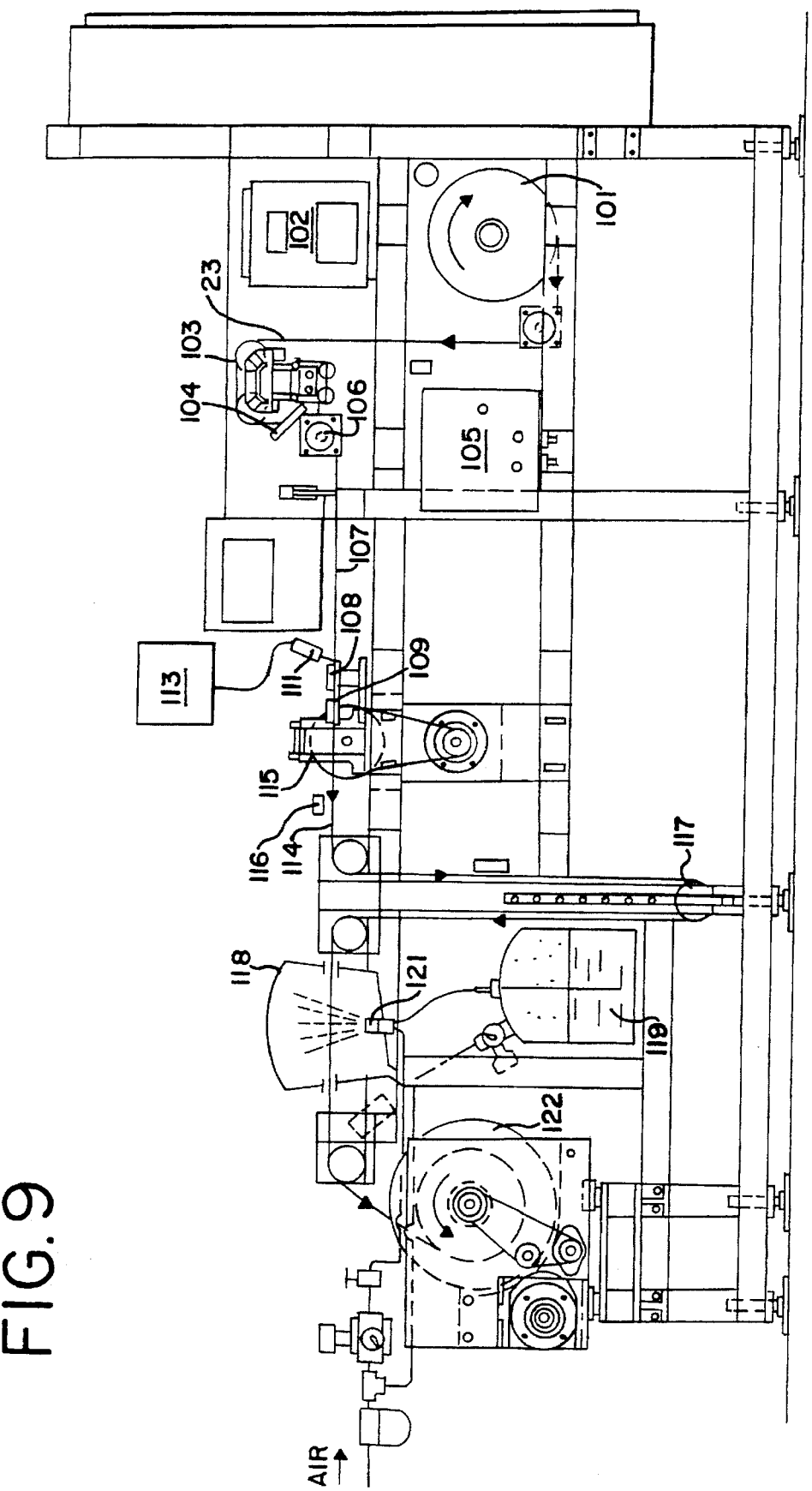
FIG. 9 is an elevational view of a typical apparatus upon which casings in accordance with the present invention can be fabricated, showing a preferred moisturizing chamber.
Figure 13:
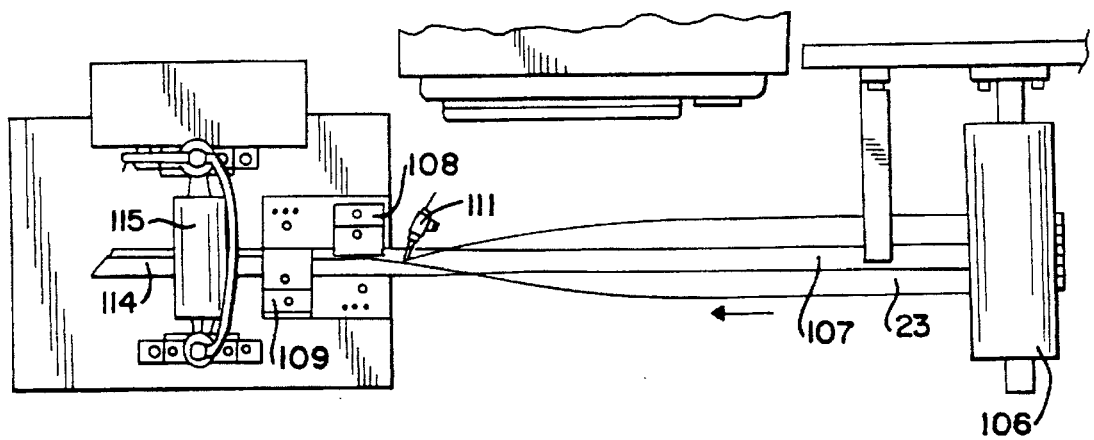
FIG. 13 is a detailed, plan view showing the tube formation and solvent addition station which is schematically illustrated in FIG. 9.
Figure 14:
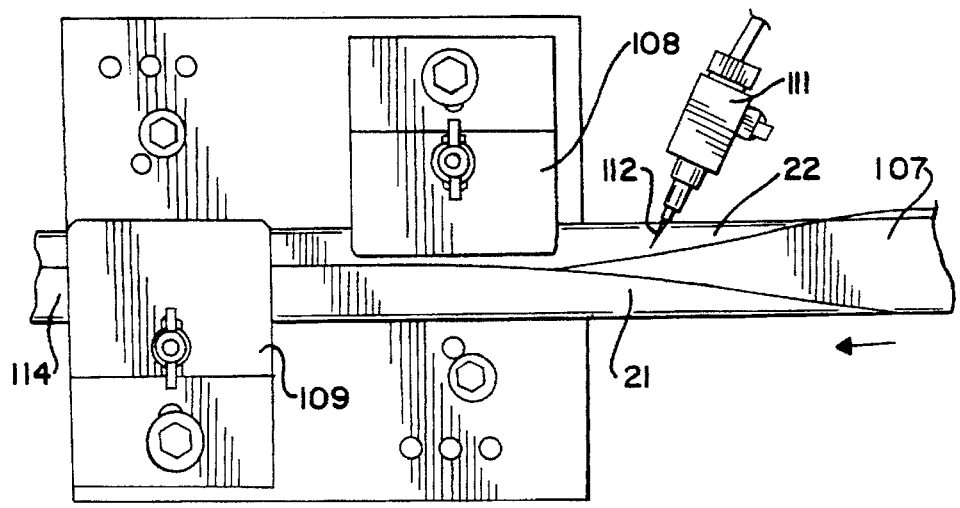
FIG. 14 is a further detailed top plan view of a portion of the station illustrated in FIG. 13.

In the illustrated embodiment shown in FIG. 9, FIG. 13 and FIG. 14, flat rollstock 23 is unwound from unwind reel 101 of flat stock or web material to provide the flat sheet 23. Same can be accomplished in conjunction with a controller 102. In a preferred arrangement, the sheet material 23 passes through web guide steering rolls 103 including an edge detector 104 and a controller 105. An associated roller 106 is also provided to facilitate orientation of the stock with respect to forming mandrel 107.

Near the downstream end portion of the forming mandrel 107, there are provided a plurality of forming ploughs 108, 109. Upstream forming plough 108 folds over one of the edge portions 22 onto the forming mandrel 107, while downstream forming plough 109 folds the other longitudinal edge portion 21 over both the forming mandrel 107 and the already folded over longitudinal edge portion 22. This is perhaps best illustrated in FIG. 14.

An applicator 111 for organometallic solvent is positioned closely upstream of the upstream forming plough 108. The applicator preferably includes a syringe nozzle 112 and is supplied by a pump 113. Thus, organometallic solvent is deposited onto the longitudinal edge portion 22 of the sheet 23 as it passes along the nozzle 112 in order to thereby deposit organometallic solvent in the desired line, lines or pattern. Promptly thereafter, the forming ploughs achieve the overlap practiced in order to form the flat sheet into the flattened tubing 114. A nip roll assembly 115 is preferably provided closely downstream of the downstream forming plough 109 in order to apply desired assembly pressure to the flattened tubing 114. A web break detector 116 can advantageously be positioned at this general location, as illustrated. An optional dancer roll assembly 117 can be included. Substantially immediately downstream of the solvent applicator 111, a humidification addition assembly is provided. In FIG. 9, this is shown as a humidification chamber 118 which is supplied by gas pressurized liquid source 119 which provides pressurized water which in turn is atomized into a water mist by atomizer 121. The arrangement illustrated in FIG. 9 is for off-line casing manufacturing, and the flattened tubing is wound on a winder reel 122. Thereafter, the wound formed tubing can be shirred, packaged and stored, as desired.

Figure 10:
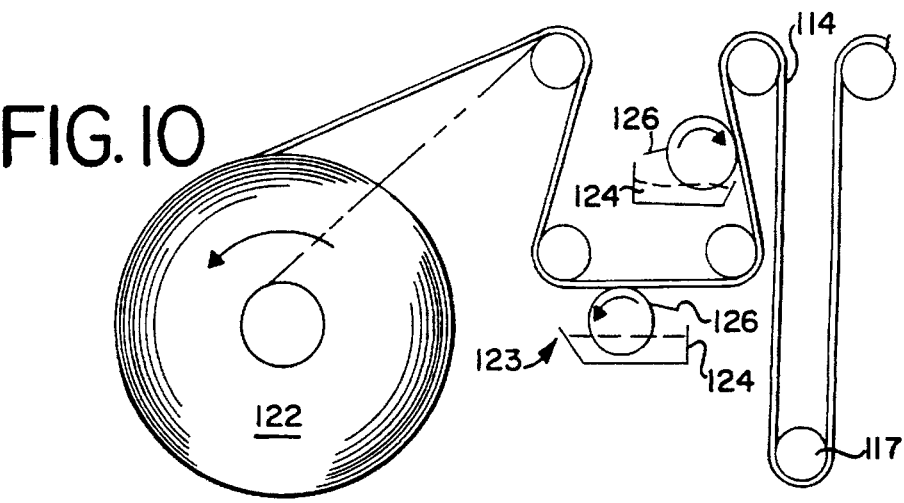
FIG. 10 is an elevational, detail view of an optional moisturizing arrangement other than the moisturizing chamber shown in FIG. 9.
Figure 11:
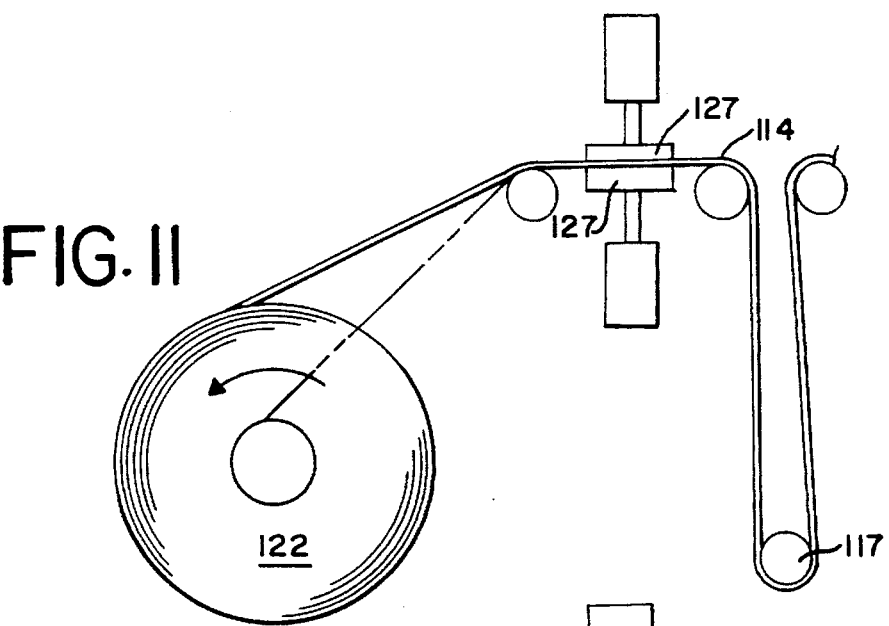
FIG. 11 is an elevational view of a further optional moisturizing arrangement.
Figure 12:
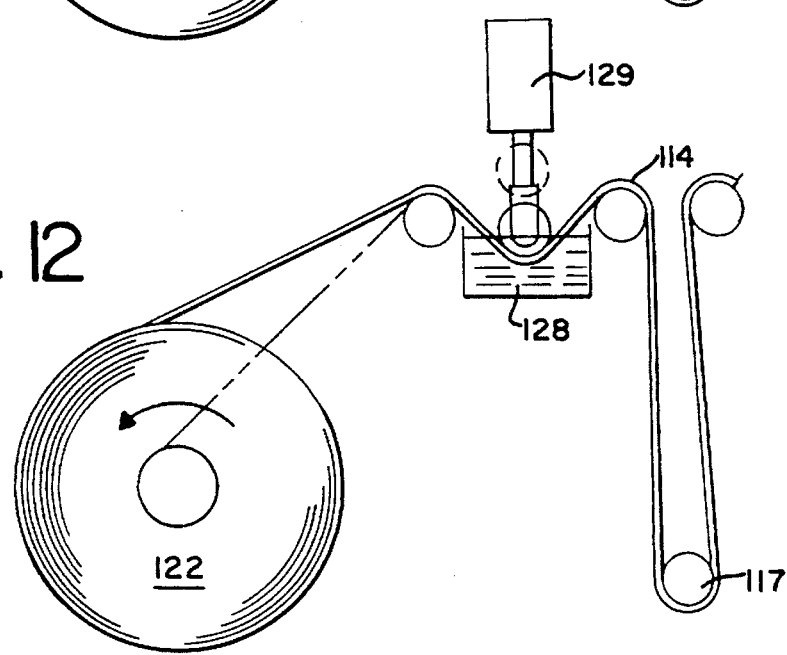
FIG. 12 is an elevational view of yet another type of optional moisturizing arrangement.

Alternative humidification stations are illustrated in FIG. 10, FIG. 11 and FIG. 12, each shown in association with a dancer roll assembly 117 and a winder reel 122.

FIG. 10 illustrated an analox coater assembly 123. The illustrated device coats both sides of the seamed flattened tubing 114, although single side coating could also be carried out. Included is a substantially open receptacle 124 for the aqueous material. A driven analox roll 125 is partially immersed into the aqueous material. A doctor blade 126 is provided to wipe off excess liquid material from the analox roll while its liquid-laden surface cells rotate upwardly prior to contacting and transferring the liquid material to the seamed flattened tubing 114. By this approach, the amount of liquid material transferred onto the seamed flattened tubing 114 is precisely controlled.

FIG. 11 shows a humidification assembly which includes a pair of generally opposing pads or brushes 127. The seamed flattened tubing 114 passes therebetween. The liquid material is forced against the tubing by any suitable biasing arrangement, and the flow of liquid to the respective surfaces of the pads 127 can be controlled in order to achieve the target moisture level for the tubing after it has passed through the humidification assembly.

The humidification assembly illustrated in FIG. 12 includes a liquid material bath 128 into which the seamed flattened tubing 114 is selectively pushed as desired. A suitable manner of accomplishing this includes a cylinder assembly 129.

As previously described, after the organometallic solvent is applied to at least one cellulose layer, it is contacted with another cellulose layer, and pressure (typically light pressure) is applied. Hydroxide ions present between the two layers deprotonate hydroxyl groups present on the second cellulose surface to again form oxide ions. The oxide ions then displace additional organic compounds from and coordinate to the metal forming the final product as shown in FIG. 3. The seamed portion of the tubing then may be passed through a stream of hot air typically at about 150° to about 300° C. (300°–570° F.), which aids in the elimination of volatile substances and any liberated organic compounds, ethylenediamine in the case of FIGS. 1–3. The finished tubing may then be immediately used for making sausage or it may be shirred and saved for future use.

In making the casings from rollstock cellulosic material by forming a longitudinal seam, the cellulose layers are overlapped for an amount suitable for the casing being made. Very small overlaps are possible and can represent an important advantage of the invention. Usually small overlaps can be more important for high volume relatively small (in diameter) casings such as for wieners. This overlap distance typically is in the range of about 2 mm to about 10 mm, preferably between about 3 mm to about 6 mm. This overlap is also typical when a film strip is used to join the opposite edges of the casing film, such as when forming a longitudinal seam. Generally, for large diameter sausage casings, the overlap width typically would be larger, as desired. Larger overlap widths can be provided as well when the casing is formed with a spiral seam where the overlap can be as much as 80% or more of the width of the film, especially if multiple layers are desirable.

Fusing agent application or bond widths can be extremely narrow. The fusing agent according to the invention can be applied in a single pattern or in multiple patterns, whether as interrupted beads or as a continuous stream. Exemplary patterns include a matrix such as intermittent beads or undulating patterns including wave forms such as sinusoidal patterns or saw-tooth or zig-zag arrangements. Generally, an undulating pattern is more tolerant of strain than is a straight or primarily longitudinally directed pattern.

Typical bond widths can range between about 0.1 mm and about 3 mm. Forming these fine seam widths is facilitated by the low viscosity of bonding solutions of the invention which allows minute quantities to be applied, for example from 0.1 to 5 ml per 1000 feet of tube, typically 0.5 to 3 ml per 1000 feet of tube.

While the reactions discussed are in accordance with chemical theory, the rapidity of the reactions and the high strength of the resulting bond joining the two cellulosic surfaces, especially upon moisture addition promptly thereafter, such as by means of an illustrated humidification addition assembly, was an unexpected and surprising result and advantage. The seamed casings prepared according to the invention exhibited great seam strength during all mechanical operations, including excellent wet strength.

Another advantage of seamed casings prepared according to the invention is that between the two layers of cellulosic film there is no relatively wide adhesive layer. As a result the presence of a light colored stripe on the final product is greatly reduced, and the resulting product has enhanced consumer appeal.

Many of the organometallic solvents according to the invention form a translucent colored seam which can act as a natural tracer to insure that a proper quantity of solvent was accurately placed. The colored band has no effect on the final product. Furthermore, the cellulosic tubing is generally removed from many products, such as skinless frankfurters, before packaging and sale. In those instances where a colorless seam is desired, this could be accomplished by changing the metal. In the example illustrated by FIGS. 1-3, a dark blue color seam is produced by the copper ion joining the two cellulosic surfaces. In some cases, the color will change over time to indicate further bond development. As another example of color variability, replacing the copper compound of FIGS. 1-3 with sodium zincate or zinc ethylenediamine would produce a product with a generally colorless seam.

The organometallic solvents which may be used in practicing the invention are selected from transitional metal organometallic compounds and the metal oxides of beryllium and zinc. Those skilled in the art will be aware that the specific metal used in a given application will depend upon the nature of that application. For example, while beryllium oxides or organomercury compounds may be chemically effective in fusing, seaming or joining two cellulosic film surfaces, such compounds would not be used for the production of foodstuffs such as sausages due to the toxicity of beryllium and mercury. Likewise, while platinum, palladium and rhodium compounds may be effective in fusing, seaming or joining two cellulosic film surfaces, such compounds might not be used in the production of foodstuffs due to cost. In food applications, copper, nickel or iron organometallic compounds, among others, would be preferred. In non-food applications, economics, compatibility with other components and color, among other considerations, might permit or even dictate the use of metal ions that would be avoided in food applications.

The organometallic compounds or organometallic complexes used in practicing the invention typically generally comprise a metal ion and an organic compound coordinated thereto. As those skilled in the art will have surmised, the organic compounds or ligands coordinated to the metal must be sufficiently labile to be replaced by the oxide ion formed on the surface of the cellulosic material. The mechanisms of ligand exchange have been discussed by F. A. Cotton and G. Wilkinson, "Advanced Inorganic Chemistry" (Interscience Publisher, New York, 1967), pages 124-158, 245-249, 434-451 and 796-1039, and in the classic work on coordination compounds by H. J. Emeleus and J. S. Anderson, "Modern Aspects of Inorganic Chemistry" (D. Van Nostrand Company, Inc., Princeton, 1962), pages 115-246 and 314-363. These publications (which are incorporated by reference hereinto) indicate that in any discussion of the ligand exchange process it is necessary to distinguish between kinetic and thermodynamic factors. A complex which is significantly dissociated in the equilibrium state will undergo rapid exchange provided that the equilibrium is determined by fast reactions. However, even if a complex is one in which the free energy of formation, a thermodynamic property, corresponds to a physically insignificant extent of dissociation, the complex may undergo ligand exchange or other substitution reactions provided that there is an alternative pathway; for example, the ability of a complex to change its geometry.

In addition to there being available a pathway for ligand exchange, the organometallic compounds used in practicing the invention must be stable in aqueous hydroxide solution. While a number of different complexes may satisfy both the pathway and stability conditions and should be understood to be included within the scope of the invention, ammonia, diamine and dicarboxylic acid complexes of selected transition metal ions are believed to be most useful. Some of the complexes known to undergo fast exchange reactions are the cyano complexes of nickel (II), palladium (II), mercury (II) and silver (I); the carboxylic acid complexes of iron (III); the diamine complexes of copper (II), nickel (II) and zinc (II); ammonia complexes such as cuprammonium chloride or hydroxide and nickel ammonium chloride or hydroxide; and the aquo complexes of iron and cobalt.

The diamines used in practicing the invention may be selected from the group consisting of biuret, 1,2- and 1,3-aliphatic diamines, 1,2-diaminobenzene and derivatives of such aliphatic and aromatic compounds. The preferred diamine compounds are biuret, [a urea condensation product], 1,2-diaminoethane, [ethylenediamine], 1,2-diaminopropane [propylenediamine], 1,2-diaminobutane, 2,3-diaminobutane, 1,3-diaminopropane, 1,3-diaminobutane, 1,2-diaminopentane, 1,3-diaminopentane, 1,2-diaminobenzene and substituted 1,2-diaminobenzene compounds wherein the substituents are electron withdrawing groups stable in hydroxide solution.

Examples of the dicarboxylate compounds which may be used in practicing the invention are those derived from oxalic acid, malonic acid, succinic acid, glutaric acid, adipic acid, phthalic acid and tartaric acid, and derivatives thereof which are stable in the presence of hydroxide ion. Tartaric is preferred.

Included within the term "organometallic solvent" are selected metal oxide compounds which contain oxygen atoms that can be made to undergo exchange reactions with the oxide species formed on the cellulose surface by the hydroxide ion present in the organometallic solvent. Such metal oxide species are formed by dissolution of the selected metal oxide in hydroxide solution. Examples include sodium zincate (zinc oxide dissolved in aqueous sodium hydroxide), sodium beryllate (beryllium oxide dissolved in aqueous sodium hydroxide), copper hydroxide (a copper salt dissolved in aqueous sodium or thallium hydroxide) and nickel hydroxide (a nickel salt dissolved in aqueous sodium or a tetraalkylammonium hydroxide).

The source of hydroxide ion may be an alkali metal hydroxide, an arylalkyl ammonium hydroxide, a quaternary ammonium hydroxide or other suitable metal hydroxides. Examples include sodium hydroxide, potassium hydroxide, cesium hydroxide, rubidium hydroxide, tetramethylammonium hydroxide, tetraethylammonium hydroxide, thallium hydroxide, and benzylammonium hydroxide. Sodium and potassium hydroxides are preferred.

In preparing the organometallic solvents used herein, the organometallic compound may be purchased either in solution form or as a dried material. Alternatively, the organometallic compound can be made on-site by methods known to those skilled in the art. For example, the basic component could be applied by an applicator separate from the rest of the organometallic solution. If purchased in dry form, the organometallic compounds will be dissolved in distilled or deionized water or hydroxide solution before subsequent use. The concentration of the organometallic compound in solution may range from about 1 weight percent up to the solubility limit of the organometallic compound or the metal oxide used in making the organometallic solvent. In general, concentrations from about 5 weight percent to just below the solubility limit have been found useful and are preferred. Solubility limits will vary from compound to compound. It is best that the maximum concentration of any organometallic compound be just below its solubility limit at the temperature of use. Commercially purchased solutions of the organometallic compounds are generally used as received or evaporated to increase concentration.

When the cupriethylenediamine hydroxide solvent is utilized, the concentration of the cupriethylenediamine hydroxide can range between about 1 weight percent, based on the weight of the solvent, up to its solubility limit. Generally speaking, higher concentrations can be attained by holding the solvent at an elevated temperature so as to increase the solubility limit. Typically, this range will be between about 5 to about 35 weight percent, preferably between about 7 and about 28 weight percent. Other compounds will be within these general ranges and will vary depending upon the solubility limit of the particular compound.

Prior to use in the seaming process, the solution of the organometallic compound may be mixed and/or diluted with aqueous hydroxide to form the organometallic solvent of the invention. Although the organometallic solvent applied to the cellulosic rollstock may have a hydroxide ion concentration in the range of about 0.25 Normal (N) up to its solubility limit at the temperature of use, the preferred hydroxide concentration is in the range of about 0.5 to about 10N. It should be evident to those skilled in the art that the exact proportions of organometallic solution and hydroxide solution which will be mixed together will depend on the initial concentration of the respective solutions and the final concentrations desired for use in the manufacturing process. If the organometallic compound was initially dissolved in a hydroxide solution, the mixing and/or dilution with hydroxide solution may be omitted. In general, it is convenient for the organometallic solvent to be about 1 Normal in hydroxide.

When necessary or required, selective substances can be added to the organometallic solvents prior to their use in the manufacturing process, For example, it may be desirable to add a cellulose softener or plasticizer to the organometallic solvent in order to enhance flexibility in the vicinity of the fusion site to thereby enhance the overall strength of the formed tubular casing. The selection and stability of such additives can be made in consultation with the additive manufacturer or it can be empirically determined. For example, solutions can be prepared and aged to determine if any precipitation occurs. Such solutions can then be tested in a pilot plant to determine if they are satisfactory for seaming cellulosic materials. The methods and procedures used in accomplishing these tasks are within the ability of those skilled in the art.

The organometallic solvent used in practicing the invention is applied to the rollstock cellulosic film at a rate in the range of about 0.1 ml to about 5.0 ml per 1000 feet of film. The exact rate of application will depend on the specific organometallic solvent being used and its concentration. Generally, higher application rates, such as up to about 10 ml, can be desired for larger diameter casings to achieve enhanced seam strength to accommodate larger and bulkier sausages by laying down a somewhat wider bond width. The organometallic solvent may be applied to one or both of the overlapping cellulosic edges which are to be mated and fused. It has also found to be advantageous that a small bead of fusing agent be applied to the moving web at a location that is in close proximity to where the forming ploughs fold over the flat web in order to form the tubing.

Tubing formation and moisture addition to enhance bond strength will typically proceed at a rate of between about 100 and about 2000 feet per minute. Generally speaking, the moisture application can proceed as quickly as shirring can proceed. A typical rate in this regard based on currently available equipment is about 500 feet per minute. When the organometallic solvent takes the form of a fusing agent such as that based on cupriethylenediamine, it is to be appreciated that the open time is very short, and it is important that the opposing edge portions be joined together before fusing is completed. A typical length of time for this type of fusing agent is less than 0.1 seconds. In a more general sense, the time between depositing of fusing agent and closing the edges of the sheet material can be between about 0.02 and about 0.25 second.

When an on-line approach is practiced, the cellulosic rollstock film is formed into a properly sized diameter tube while continuously bonding the overlapping edges of the film. Various geometric shapes can be used in the design of the forming collar or mandrel. The thus formed seamed casing is then immediately and continuously stuffed with a food emulsion and continuously processed within various cooking and chilling operations. The bond strength of the formed seam is enough to withstand the forming, stuffing and food processing operations within the concise and short amount of time required for an on-line system. Such bond strength is significantly enhanced by the moisture present within the emulsion and optionally during the initial stage of stuffing (prior to the high-stress linking stage) by additional moisture added to the outside of the casing.

The casing formation may be by pre-folding the rollstock web and then longitudinally seaming prior to stuffing on a semi-circular stuffing tube or mandrel. Also, the mandrel can exhibit a generally symmetrical cross-section composed of generally back-to-back arcuate segments. Alternatively, the rollstock web may be spirally wound and seamed around a circular mandrel or stuffing tube. Winding can be at an angle to the longitudinal axis of about 30° to about 70°, preferably between about 40° and 60°. Due to the short period of time between application of the fusing agent and the stuffing of food emulsion into the on-line formed casing, the fusing agents utilized have to exhibit the advantage of providing an immediate bond set once applied to the seam location. The fused seam as described herein forms in less than 3 seconds after overlapping of the film edges.

In an important aspect of the present invention, the moisture addition is carried out in a carefully controlled manner. The objective is to reach a target moisture level just prior to shirring or linking. A general range for such moisture level is between about 17 and 27 weight percent, typically not greater than about 24 weight percent, the preferred range being between about 20 and 23 weight percent moisture. It will be appreciated that the moisture level of cellulosic casing prior to moisture addition, such as that of the seamed flattened tubing 114 (FIG. 9) will vary somewhat. Typically, such moisture level is at about 7 or 8%, but in some cases could be as high as about 10%. Accordingly, the actual amount of moisture added by the humidification addition assembly chosen (particularly for off-line casing making) will typically have to vary somewhat depending upon the moisture level of the starting cellulosic material or web. For this reason, the humidification addition assembly should have adequate flexibility to allow variations in moisture addition in response to changes in moisture levels of the upstream cellulosic material. An important feature of the invention is that exceptionally great seam strength is obtained reliably by applying the added moisture as soon as reasonably possible after fusing. Such makes the fusing agent more effective.

In addition, providing the amount of moisture within these calibrated ranges not only augments the strength of the seam of the tubing thus formed, but it also produces physical properties that are advantageous to further processing. Physical properties such as softness and flexibility are imparted to the film which are necessary to advantageously withstand the mechanical strain of shirring without developing pin hole failures or the like.

Alternatively, the moisture can be added in-line with shearing, in which case the moisture application in accordance with the present invention should be far upstream of the nip rollers which control the speed of the tubing through shirring equipment. This enhances the ability of the moisture addition to absorb and finalize its fusing agent enhancement effect before the formed tubing is subjected to the rigors of shirring.

The following examples are provided to illustrate the invention and are not intended to restrict the scope thereof. All percentages are expressed as weight percentages. The rollstock film used in practicing the invention has a thickness in the range of 0.3 to 5.0 mils. Thicknesses in the range of 0.5–2.0 mils are preferred for manufacturing small casings such as frankfurter casings. The rollstock has a moisture content in the range of 5–13% and a glycerin content in the range of 5–20%. Preferred values are 5–10%, most preferably 6–8%, for moisture and 8–12% for glycerin.

In the following Examples 1–7, a cellulose or cellulose derivative rollstock is formed off-line into a layflat tubular casing by being seamed or bonded into tubular form using an organometallic solvent as the fusing agent. Layflat tubular casing can be made using forming mandrels of various geometries. Forming line speeds can be as fast as 2000 feet/minute, typically on the order of 1000 feet/minute. Humidification can be added after seaming to a level of about 17 weight percent to about 27 weight percent, preferably between about 20 and about 23 weight percent. This humidification proceeds immediately after fusing agent application. The seamed casing then can be shirred into hollow sticks or onto suitable supports for future use in the production of sausages or sausage-like food products.

EXAMPLE 1

A 9000 foot roll of 2¹³⁄₁₆ inch wide, 1.1 mil thick, uncoated regenerated cellulose rollstock film comprised of about 7–8% moisture and 9–10% glycerine softener was unwound at a speed of about 60 feet per minute. The sheet was continuously folded and wrapped about a selected forming mandrel to provide a layflat tube of 1.32 inches in width. Just prior to the overlapping and contact of the longitudinal edge areas of the film, a 21% cupriethylenediamine hydroxide fusing agent was applied at a rate of 1.8 ml/1000 feet of film, to one of the overlapping edges. The edge having the fusing agent applied was then overlapped and mated with the second longitudinal edge. Seaming of the film occurred via the reactions described above and resulted in a cellulosic seam crosslinked by the metal present in the fusing agent. The seamed cellulosic casing or tube is then passed through a humidification chamber which increased the moisture content of the film to about 21 to 22 weight percent, which is also an optimum shirring and processing level. The seamed casing is then level wound in layflat form to be shirred at a later time.

At the time of shirring, the spool of moisturized layflat casing is unwound at a rate of 500 feet per minute and compressed into a hollow shirred stick using commercial shirring equipment. The shirring equipment used in these examples utilizes an oscillating system to disperse the seamed portion of the tubular casing around the stick, thereby avoiding curvature in the hollow stick due to increased film thickness at the seam site. The thus shirred casing has an appearance as shown in FIG. 6, which depicts the seam 31 in a generally V-shaped pattern developed by the oscillating action in forming the shirred casing 32.

In casings manufactured as described in this Example 1, the fusing agent and cellulose alone maintain superior seam bond strength throughout the shirring, stuffing, cooking and chilling operations which produce sausages and sausage-like products, which bond strength exceeds that achieved when the humidification procedure is omitted. When stuffed with meat emulsion, the casing prepared according to the invention provides a product of consistent diameter and color.

EXAMPLE 2

A casing is prepared as in Example 1 except that the film is unwound, folded and wrapped or closed at a speed of up to about 2000 feet/minute. Prior to overlapping the edges of the cellulosic film, a solution of 21% cupriethylenediamine hydroxide is applied to the lower film edge (see FIG. 1) at a rate of about 0.5 ml/1000 feet of film. A stream of heated air at a temperature of about 200° C. is directed on the seamed region by means of an elongated slotted nozzle. The remaining steps of the casing manufacturing process are as described in Example 1. The resulting casing is satisfactory for sausage manufacturing.

EXAMPLE 3

A casing is prepared as described in Example 1 except that the fusing agent is a 10.5 wt % cupriethylenediamine solvent manufactured by diluting 21 wt % cupriethylenediamine hydroxide with 1N sodium hydroxide. The fusing agent is applied to the film at a rate of about 1.8 ml/1000 feet of film. The resulting casing was found to be satisfactory for sausage manufacturing.

EXAMPLE 4

A casing is prepared as described in Example 2 except that the fusing agent is a 10.5 wt % cupriethylenediamine hydroxide Solution prepared by diluting a 21 wt % cupriethylenediamine solution with an equal volume of 1N sodium hydroxide. The resulting organometallic solvent is applied at a rate of about 1.00 ml/1000 feet of film.

EXAMPLE 5

A casing is prepared as described in Example 3 except that the fusing agent is a 10 wt % sodium iron tartrate solution prepared by dissolving sodium iron tartrate in 2N sodium hydroxide. A powder-like form of the iron complex can be used in preparing this organometallic solvent.

EXAMPLE 6

A casing is prepared as described in Example 4 except that the fusing agent is 10 wt % sodium iron tartrate in 2N sodium hydroxide.

EXAMPLE 7

A casing is prepared as described in Example 1 except that the fusing agent is sodium zincate in the range of 5–20 wt % in 0.5–2.0N sodium hydroxide. Alternatively, tetramethylammoniumhydroxide is used in place of sodium hydroxide.

EXAMPLE 8

A casing is made in accordance with Example 1, except the cupriethylenediamine solution is at a concentration of 10 percent.

In the following Examples 9–13, rollstock cellulose or cellulose derivative film is formed on-line into a tubular casing, seamed using an organometallic solvent according to the invention, and immediately stuffed and processed into sausages or sausage-like products.

EXAMPLE 9

A 9000 foot roll of uncoated, regenerated cellulose rollstock film was formed into a continuous, longitudinally seamed casing for processing into sausages or sausage-like products on a continuous processing unit. The cellulose film was $2^{13}/_{16}$ inches in width and had a thickness of 1.1 mils. The cellulose film had a moisture content of 8% and a glycerin softener content of 10%. A web tensioner was used to keep the unwind operation controlled to the correct speed. The cellulose film was guided to a forming collar which folded the flat film into a round tube. The formed tube passed through the inner bore of the forming collar and then passed over a 0.80 inch diameter circular stuffing horn.

A seaming fixture caused the inner flap of the seam to be laid down on the mandrel surface to facilitate placement of the fusing agent by means of a 0.006 inch orifice needle mounted essentially perpendicular to the flap. The fusing agent was a 21% cupriethylenediamine hydroxide solution applied at a rate of 3.35 ml/1000 feet of film. Just past the needle tip, the closure fixture laid the outer flap down on top of the inner flap. Immediately after the closure of the seam, a stream of 400° F. air was directed to the seam through an elongated slotted nozzle to accelerate bond formation. The formed tube was then pulled forward off the mandrel by a pair of profiled feed rollers which operate astride the stuffing horn. The stuffing horn terminated closely downstream from the rollers to allow the meat emulsion to fill the casing in preparation for linking and processing.

The entire forming, seaming and stuffing process occurs within a distance of 3 feet and was accomplished in less than 4 seconds. The seamed casing prepared as described herein functioned in the same manner as an extruded casing and yielded a product of consistent diameter. No objectionable striping or discoloration was observed on the final product after smoking cooking and packaging.

EXAMPLE 10

A casing was prepared as described in Example 9 except that the fusing agent was 10.5% cupriethylenediamine hydroxide solution. The 10.5% fusing agent was made by combining 21% cupriethylenediamine hydroxide with 1N sodium hydroxide.

EXAMPLE 11

A casing is prepared as described in Example 9 except that the fusing agent used in the process is a 10% sodium iron tartrate solution made by dissolution of sodium iron tartrate in 2N sodium hydroxide.

EXAMPLE 12

A casing is prepared as described in Example 9 except that the rollstock film is pre-rolled into an overlapping layflat tube, but not seamed. The pre-folded tube is then continuously unfolded around a semi-circular mandrel/stuffing tube without the use of a forming collar. The fusing agent is then applied to one longitudinal film edge and the film edges are guided so as to re-close around the mandrel/stuffing tube to produce a fused, seamed cellulose tube.

EXAMPLE 13

A 9000 foot roll of rollstock cellulose or cellulose derivative was formed into a continuous spiral seamed tubular casing to be used in the processing of sausages or sausage-like products. The roll was unwound at a 45° angle to the forming mandrel/stuffing tube at a rate of 140 feet/minute. Prior to winding the film onto the mandrel, a fusing agent comprising 21% cupriethylenediamine hydroxide solution was applied to a longitudinal film edge at the rate of 1.15 ml per 1000 feet of film. The film was then driven by belts at an angle around the mandrel such that the film overlaps the mandrel in spiral fashion. A film web registration system tracked the movement of the film and ensured that the fusing agent was placed in the proper location and the longitudinal edges of the film were properly overlapped. A stream of about 200° F. air was directed against the seamed portion of the tube to expedite fusing. The terminal end of the mandrel/stuffing horn was closely spaced to the seaming area, allowing a meat emulsion to fill the formed casing within a minimum time of seam formation. The filled casing is suitable to be made into links and further processed to produce sausages or sausage-like products.

The entire casing forming, seaming and stuffing operation takes place within a distance of 3 feet and in less than 1 second, and the fused seam was extremely narrow. The casing prepared using the cupriethylenediamine hydroxide solvent disclosed herein produces a fused casing that has performance characteristics similar to an extruded casing.

The tubular casing produced, either on-line or off-line, in accordance with the invention may be used for the processing and packaging of sausages and sausage-like products. These casings may also be used for the processing or packaging of additional other food or other products.

We claim:

1. A method for producing a cellulosic tubular casing suitable for the manufacture of sausages and sausage-shaped products, the method comprising the steps of:

providing an elongated cellulosic flat stock having longitudinal edge portions;

applying an organometallic solvent to at least one of the longitudinal edge portions of the cellulosic flat stock;

overlapping the longitudinal edge portions with one another so that the organometallic solvent contacts both of said longitudinal edge portions and so that said elongated cellulosic flat stock is formed into a seamed cellulosic tubular casing, said organometallic solvent generally defining the location of an elongated seam of the seamed cellulosic tubular casing; and adding moisture to said seamed cellulosic tubular casing along at least said elongated seam, whereby the strength of the elongated seam is increased.

2. The method in accordance with claim 1, wherein the moisture of said adding step is substantially entirely water.

3. The method in accordance with claim 1, wherein said step of adding moisture adds moisture such that said seamed cellulosic tubing casing has a water content of equal to or greater than about 17% by weight, based upon the total weight of the seamed cellulosic tubular casing.

4. The method in accordance with claim 1, wherein said step of adding moisture imparts to said seamed cellulosic tubular casing a water content of between about 17 and about 24 weight percent, based upon the total weight of the seamed cellulosic tubular casing.

5. The method in accordance with claim 1, wherein said step of adding moisture imparts to said seamed cellulosic tubular casing a water content of between about 20 and about 23 weight percent, based upon the total weight of the seamed cellulosic tubular casing.

6. The method in accordance with claim 1, wherein said step of adding moisture imparts to said seamed cellulosic tubular casing a water content of between about 21 and about 22 weight percent, based upon the total weight of the seamed cellulosic tubular casing.

7. The method in accordance with claim 1, wherein said organometallic solvent comprises an aqueous solution which contains a selected organometallic complex, the concentration of said organometallic complex being as great as about the solubility limit of the complex in the aqueous solution at the temperature of the solution.

8. The method in accordance with claim 7, wherein said organometallic solvent aqueous solution is between about 0.25 Normal in hydroxide up to its solubility limit at a given application temperature.

9. The method in accordance with claim 1, wherein said applying step applies the organometallic solvent to at least two of the longitudinal edge portions.

10. The method in accordance with claim 7, wherein the organometallic complex of the organometallic solvent is selected from the group consisting of ammonia organometallic complexes of iron, cobalt, nickel, copper, cadmium, zinc, rhodium and palladium;

diamine organometallic complexes of iron, cobalt, nickel, copper, cadmium, zinc, rhodium and palladium; and carboxylate organometallic complexes of iron, cobalt, nickel, copper, cadmium, zinc, rhodium and palladium.

11. The method in accordance with claim 10, wherein the organometallic complex is selected from the group consisting of iron tartrate, ethylenediamine complexes of cobalt, ethylenediamine complexes of copper, ethylenediamine complexes of zinc, ethylenediamine complexes of nickel and ethylenediamine complexes of cadmium.

12. The method in accordance with claim 11, wherein the organometallic complex is selected from the group consisting of cupriethylenediamine hydroxide and sodium iron tartrate complexes in 0.5–10 Normal sodium hydroxide solution.

13. The method in accordance with claim 7, wherein the concentration of the organometallic complex is at least about 1 weight percent.

14. The method in accordance with claim 7, wherein the concentration of the organometallic complex is in the range of about 5 to about 35 weight percent, based on the weight of the organometallic solvent.

15. The method of claim 14, wherein said concentration is between about 7 and about 25 weight percent.

16. The method in accordance with claim 1, wherein said overlapping step follows a substantially linear longitudinal path, and the tubular casing formed by the method has a longitudinal seam.

17. The method in accordance with claim 1, wherein said overlapping step follows a substantially helical path, and the tubular casing formed by the method has a helical seam.

18. The method in accordance with claim 11, wherein said longitudinal edge portions are opposite edges of a single cellulosic film.

19. The method in accordance with claim 1, wherein said longitudinal edge portions are of a film sheet and of a film strip positioned along opposing edges of said sheet.

20. The method in accordance with claim 11, wherein said seamed cellulosic tubular casing has an overlap area with a width of between about 2 mm and about 10 mm.

21. The method in accordance with claim 1, wherein said seamed cellulosic tubular casing has an overlap area with a width of as great as about 80% of the width of said cellulosic material.

22. The method in accordance with claim 1, wherein said elongated seam has a bond width of between about 0.1 mm to about 3 mm.

23. The method in accordance with claim 1, wherein said applying is at a rate of between about 0.1 and about 10 ml per 1000 feet of cellulosic material.

24. The method in accordance with claim 1, wherein said applying is in the form of multiple beads of said solvent.

25. The method in accordance with claim 1, wherein said solvent is applied in an interrupted pattern.

26. The method in accordance with claim 1, wherein said solvent is applied in an undulating pattern.

27. The method in accordance with claim 1, wherein said organometallic solvent is selected from the group consisting of: aqueous 5–35% cupriethylenediamine hydroxide, aqueous cupriethylenediamine hydroxide diluted with alkali metal hydroxide, aqueous cupriethylenediamine hydroxide diluted in tetraalkylammonium hydroxide, iron sodium tartrate in aqueous alkali metal hydroxide, and iron sodium tartrate in tetraalkylammonium hydroxide.

28. A method for fusing, joining or seaming cellulosic materials, said method comprising the steps of: applying an organometallic solvent including a hydroxide containing solution of a selected organometallic compound or metal oxide compound to a first cellulosic surface and overlapping said first cellulosic surface with a second cellulosic surface so that the hydroxide containing solution is between the first and second surfaces, the first and second surfaces being seamed by a chemical reaction in which the metal contained in the selected organometallic or metal oxide compound crosslinks the first and second cellulosic surfaces to thereby form a seam between the first and second cellulosic surfaces, said method further comprising adding moisture along at least said seam in order to increase the strength of the seam.

29. The method according to claim 28, wherein:

(a) the organometallic compound is selected from the group consisting of transition metal complexes, ammonia complexes, diamine complexes and dicarboxylate complexes; and (b) the metal oxide compound is selected from the group consisting of zinc oxides and beryllium oxides.

30. The method according to claim 29, wherein:

(a) the transition metal is selected from the group consisting of copper, nickel, cobalt, cadmium, palladium, zinc, iron, and rhodium;

(b) the diamine is selected from the group consisting of biuret, ethylenediamine, propylenediamine, 1,3-diaminopropane, 1,2-diaminobutane, 1,3-diaminobutane, 2,3-diaminobutane, 1,3-diaminopentane, 1,3-diaminopentane, 1,2-diaminobenzene, and substituted 1,2-diaminobenzene compounds wherein the substituents are electron withdrawing groups stable in hydroxide solution; and (c) the dicarboxylate is selected from the group consisting of oxalic acid, malonic acid, succinic acid, glutaric acid, adipic acid, phthalic acid, tartaric acid, and derivatives thereof which are stable in the presence of hydroxide ions.

31. The method according to claim 28, wherein the hydroxide concentration in the organometallic solvent is in the range of about 0.25 Normal up to its solubility limit at a given application temperature.

32. The method according to claim 28, wherein the hydroxide concentration in the organometallic solvent is in the range of about 0.5 to about 10 Normal.

33. The method according to claim 28, wherein the concentration of organometallic compound or metal oxide compound in the organometallic solvent is in the range of about 5% to about the solubility limit of the organometallic compound in the solution at a given application temperature.

34. The method according to claim 28, wherein the organometallic compound is selected from the group consisting of cupriethylenediamine hydroxide, cobalt ethylenediamine hydroxide, zinc ethylenediamine hydroxide, nickel ethylenediamine hydroxide, cadmium ethylenediamine hydroxide, copper-biuret in potassium hydroxide, nickel-biuret in potassium hydroxide, sodium iron tartrate in sodium hydroxide, copper chloride in thallium hydroxide, copper chloride in sodium hydroxide, copper hydroxide in thallium hydroxide, and copper hydroxide in sodium hydroxide.

35. The method according to claim 34, wherein the concentration of the selected organometallic compound in the organometallic solvent is in the range of about 5% to about the solubility limit of the organometallic compound in the solution at a given application temperature.

* * * * *

UNITED STATES PATENT AND TRADEMARK OFFICE
CERTIFICATE OF CORRECTION

PATENT NO. : 5,658,414
DATED      : August 19, 1997
INVENTOR(S): Norman C. Abler, Zbigniew S. Borkiewicz and Donald E. Lucke It is certified that error appears in the above-indentified patent and that said Letters Patent is hereby corrected as shown below:

```
Col. 1, line 34, delete "bypassing" and insert --by passing--;
       line 39, delete "Joined" and insert --joined--.
Col. 2, line 19, delete "Joining" and insert --joining--.
Col. 6, line 22, delete "Cellulosic" and insert --cellulosic--.
Col. 10, line 38, delete the comma after "biuret"; line 39,
       delete the comma after "1,2-diaminoethane".
Col. 11, line 60, "process, For example" should read
       --process. For example--.
Col. 12, line 51, "may be by" should read --may be accomplished by--.
Col. 14, line 64, delete "Solution" and insert --solution--.
Col. 17, line 43, insert a colon --:-- after "consisting of".
```

Signed and Sealed this

Twenty-third Day of March, 1999

Attest:

Q. TODD DICKINSON

Attesting Officer

Acting Commissioner of Patents and Trademarks